United States Patent
Doyle et al.

(10) Patent No.: US 6,541,072 B1
(45) Date of Patent: Apr. 1, 2003

(54) METHOD FOR MAKING A COATED SUBSTRATE HAVING HIGH MVTR

(75) Inventors: Robert E. Doyle, Adrian, MI (US); Mohamed A. Fahmy, Kalamazoo, MI (US); James G. Moore, Jacksonville, FL (US)

(73) Assignee: Tyco Plastics Services AG, Schaffhausen (CH)

( * ) Notice: Subject to any disclaimer, the term of this patent is extended or adjusted under 35 U.S.C. 154(b) by 316 days.

(21) Appl. No.: 09/657,011

(22) Filed: Sep. 7, 2000

Related U.S. Application Data

(62) Division of application No. 09/175,820, filed on Oct. 20, 1998, now Pat. No. 6,133,168.

(51) Int. Cl.[7] .................................................. B05D 1/36
(52) U.S. Cl. ...................... 427/411; 427/412; 264/45.9; 264/176.1
(58) Field of Search ............................... 427/407.1, 411, 427/412; 442/76, 77, 164; 264/45.9, 176.1

(56) References Cited

U.S. PATENT DOCUMENTS 4,877,679 A    10/1989   Leatherman et al. ........ 428/224

FOREIGN PATENT DOCUMENTS

| GB | 2341578 | * | 3/2000 |
| WO | WO 99/28129 | * | 6/1999 |

* cited by examiner

*Primary Examiner*—Erma Cameron
(74) *Attorney, Agent, or Firm*—Donald R. Fraser

(57) ABSTRACT

A process for preparing a coated substrate having an MVTR greater than about 5 perms comprises the steps of providing a substrate, applying onto a surface of the substrate a layer of a primer, comprising a polyamine or polyacetate, and extrusion coating a monolithic layer of breathable polymer onto the layer of primer.

8 Claims, No Drawings

METHOD FOR MAKING A COATED SUBSTRATE HAVING HIGH MVTR

CROSS-REFERENCE TO RELATED APPLICATION

This application is a divisional application of U.S. utility patent application Ser. No. 09/175,820, filed Oct. 20, 1998, now U.S. Pat. No. 6,133,168.

FIELD OF THE INVENTION

This invention relates generally to a method for making a flexible or rigid coated substrate having a high moisture vapor transmission rate (MVTR) including an extrusion coated layer of a breathable polymer adhered thereto, and a primer layer intermediate the substrate and the extrusion coated breathable polymer layer.

BACKGROUND OF THE INVENTION

Polymer coated papers and water resistant sheathing materials are known to be useful in the construction industry, for preventing the infiltration of air and water to the interior of a building while allowing the outward passage therethrough of moisture vapor. Such materials may be flexible and used as building "wraps," or may be rigid and used as structural or decorative panels in the exterior walls or roofs of buildings.

Typical breathable materials comprise a flexible or rigid substrate, overlaid with a polymer layer which has been mechanically or electrically perforated, embossed, or stretched to produce "holes" therethrough, said holes being small enough to substantially prevent the flow therethrough of air and water, but large enough to allow the passage of moisture vapor. An example of a breathable material, comprising a resin blended with inorganic fillers which is then extruded into a film and biaxially stretched or stretched in a single direction is EXXAIRE from Exxon Inc.

While monolithic breathable polymer films are known in the prior art, it is also known that such films, when applied to substrates utilizing the heat and pressure associated with conventional lamination processes, often delaminate from the supporting substrates.

It would be desirable to prepare a coated substrate having a high MVTR, wherein the resultant laminate would retain its structural integrity while preventing the flow therethrough of air and water but allowing the passage therethrough of moisture vapor.

SUMMARY OF THE INVENTION

Accordant with the present invention, there has surprisingly been discovered a process for preparing a coated substrate having a high MVTR. The process comprises the steps of:

providing a substrate;

applying onto a surface of the substrate a layer of a primer, comprising a polyamine or polyacetate; and extrusion coating a monolithic layer of breathable polymer onto the layer of primer.

The coated substrate according to the present invention is particularly useful as a building wrap in its flexible form and a wall panel or roof underlayment in its rigid form.

DETAILED DESCRIPTION OF THE PREFERRED EMBODIMENT

The coated substrate having a high MVTR according to the present invention comprises: a substrate; a monolithic, extrusion coated layer of a breathable polymer; and a primer layer intermediate and adhered to the substrate and the monolithic, extrusion coated layer of breathable polymer. The inventive coated substrate is prepared by providing a substrate, applying onto a surface of the substrate a layer of primer comprising a polyamine or polyacetate, and extrusion coating a monolithic layer of a breathable polymer onto the layer of primer. The resultant coated substrate according to the present invention has an MVTR in excess of about 5 perms. By the term "perm" as it is used herein is meant the rate of moisture transfer in units of grams/hour/square feet/inch of Hg.

The coated substrate according to the present invention may be prepared utilizing conventional equipment. The substrate is generally conveyed toward an application station where the primer and extrusion coated breathable polymer are consecutively applied to a surface thereof. Where the substrate is a flexible material, it may be paid-out from a supply roll. Alternatively, the substrate may be a relatively rigid material which is conveyed directly from a production facility. The primer layer may be applied to the substrate by any conventional method such as, for example, by spraying, pouring, roll coating, brush coating, or the like. Thereafter, the substrate, having the primer layer adhered to a surface thereof, is advanced over a nip roll. Prior to its entrance into the nip, an extrusion coated layer of a breathable polymer is coated onto the primer layer, and the entire assemblage passed into the nip. The assemblage is pressed together between the nip roll and an associated back-up or chill roll. The resultant laminated, coated substrate is thereafter accumulated on a take-up roll, or immediately cut into panels, depending upon whether the substrate is flexible or rigid, respectively. Processes for extrusion coating a layer of a polymer onto a supporting substrate and laminating the plies together are more fully set forth in U.S. Pat. No. 5,554,246 to Anwyl, Jr., which is incorporated herein in its entirety by reference thereto.

The substrate according to the present invention may be any substrate conventionally used in the construction industry for making flexible wraps or rigid panels designed to prevent the passage of air and water. Suitable substrates include, but are not necessarily limited to, non-woven fabrics, paperboard, chipboard, kraft paper, veneers, wood or cellulose composites, natural or synthetic films, foils, glass fiber mats, woven fabrics, and the like, as well as multi-layered laminated structures comprising same. Laminates of these materials are well-known in the construction industry as substrates useful for the manufacture of building wraps, exterior and interior wall panels, floor components, roof underlayments, etc.

Preferred flexible substrates for use according to the present invention comprise open weave fabrics including, but not necessarily limited to, high, medium and low density polyethylene, polypropylene, and polybutylene fiber mats, as well as mats made from blends and copolymers of polyethylene, polypropylene, polyester, fiberglass, and polybutylene fibers. Additionally, the open weave fabric may comprise glass or graphite fibers with or without an organic or inorganic binder. Furthermore, the open weave fabric may contain fibers made from fiberglass, polyolefins, polyesters, acrylics, polycarbonates, polyurethanes, and the like, as well as blends and copolymers thereof. By the term "open weave" as it is used herein is meant a woven or non-woven matt of fibrous material. A preferred open weave fabric which may be used as a flexible substrate according to the present invention is a high density polyethylene fiber fabric which may be obtained from Amoco Fabrics and Fibers Company of Atlanta, Ga. under the trade designation "CLAF."

A preferred, more rigid substrate for use according to the present invention comprises a well-known paperboard material or a laminate comprising multiple layers of paperboard bonded together with an adhesive. By the term "paperboard" as it is used herein is meant all forms of paper and paperboard-like materials known as useful for manufacturing composite structures. Particularly useful paperboard materials include kraft paper and kraft liner board, which materials are made primarily from pine wood by digestion with a mixture of caustic soda, sodium sulfate, sodium carbonate, and sodium sulfide. These materials may additionally contain conventional paper adjuvants such as, for example, strength increasing agents, sizing agents such as, for example, paste rosin, liquid rosin, dispersed rosin, alkyl ketene dimer, alkenyl succinic anhydride, styrene maleic anhydride, wax emulsions, and latex polymer emulsions, preservatives, fillers, clays, kaolin, talc, barium sulfate, calcium carbonate, and the like. The paperboard may vary in thickness over wide limits from about 0.003 inch to about 0.2 inch. A preferred kraft paperboard having a thickness of about 0.037 inch may be obtained from Tenneco Packaging.

A critical aspect of the present invention comprises the use of a primer layer, to insure the adhesion of the extrusion coated breathable polymer onto the substrate. The need for such a primer layer is unexpected, as evidenced by the prior art which is replete with disclosures describing the deposition of an extrusion coated layer of polymer directly onto a substrate. According to the instant invention, it has been discovered that a monolithic, extrusion coated breathable polymer layer deposited directly onto a substrate, and conventionally laminated thereto by the application of heat and pressure, will not adhere aggressively to the substrate without the use of the disclosed primer.

The primer according to the present invention is a polyamine or polyacetate. Preferred individual primers for forming the primer layer according to the present invention are polyethylene amine and polyvinyl acetate available from Morton International, 100 North Riverside Plaza, Chicago, Ill. 60606-1596 and Mica Corporation, 80 Lupes Drive, Stratford, Conn. 06497 under the product designations "ADCOTE 1544" and "MICA M1487," respectively. The primer layer may be applied by any conventional application method, directly to the surface of the substrate. The thickness of the primer layer may be quite small. As will be readily apparent to one ordinarily skilled in the art, the primer layer need only be thick enough to cause aggressive bonding of the subsequently applied monolithic extrusion coated layer of breathable polymer to the substrate.

The extrusion coated layer of breathable polymer may be applied to the primed substrate by well-known extrusion coating techniques. The polymer layer is substantially impervious to the transmission therethrough of liquid water, but has a molecular structure which allows the passage of moisture vapor therethrough. By the term "breathable polymer" as it is used herein is meant that the polymer layer is substantially impervious to liquid water, but is highly permeable to moisture vapor. The breathable polymer layer may comprise conventionally known permeable resins made from copolyesters, polyesters, polyurethanes, acrylic polymers, polyethers, ester-ether copolymers, and the like, as well as blends and copolymers thereof. The thickness of the breathable polymer layer may vary over wide limits from about 0.0002 inch to about 0.005 inch. Preferably, the thickness is about 0.001 inch. A particularly preferred breathable polymer comprises "EASTMAN 20541" copolyester, available from the Eastman Chemical Company.

The resulting coated substrate substantially prevents the passage therethrough of air and water, but allows the transmission of moisture vapor at a rate exceeding 5 perms. The unique monolithic extrusion coated polymer layer component of the coated substrate exhibits this high MVTR, without perforating and stretching either the polymer layer or the laminated structure. This is a distinct advantage over the processes for preparing the building wraps, wall components, and roofing underlayments of the prior art. The monolithic extrusion coated breathable polymer layer of the coated substrate according to the present invention gives the product its barrier characteristics, while the substrate imparts dimensional stability and handlability to the product.

Preferably, the coated substrate according to the present invention is manufactured by a continuous process, utilizing uninterrupted stocks of substrate conveyed through continuous coating stations where the primer layer and monolithic extrusion coated breathable polymer layer are applied.

EXAMPLE

ADCOTE 1544 is applied as a primer layer to a moving web of an open weave substrate (CLAF) utilizing a conventional liquid spray head. The primer layer is quickly dried by passing a stream of heated air over the advancing, primed substrate. Thereafter, a copolyester (EASTMAN COPOLYESTER 20541 is extrusion coated at a temperature of about 400 degrees F. onto the advancing, primed substrate, at a rate so as to form a monolithic layer of a breathable polymer about 1 mil thick. The substrate, having the primer and monolithic, extrusion coated breathable polymer layers thereon, is passed between a nip and chill roll, to laminate the assemblage together. The resultant coated substrate is accumulated on a take-up roll, for subsequent use as a building wrap, moisture barrier, roof underlayment, etc. The coated substrate has an MVTR of about 12 perms, and the polymer layer is aggressively adhered to the substrate.

COMPARISON

A copolyester (EASTMAN COPOLYESTER 20541 is extrusion coated at a temperature of about 400 degrees F. onto a moving web of an open weave substrate (CLAF), at a rate so as to form a monolithic layer of a breathable polymer about 1 mil thick. The substrate having the monolithic extrusion coated breathable polymer layer thereon, is passed between a nip and chill roll, to laminate the assemblage together. The resultant coated substrate is accumulated on a take-up roll. The coated substrate exhibits poor adhesion between the monolithic, extrusion coated breathable polymer layer and the substrate, and the MVTR is less than 5 perms.

The Example may be repeated with similar success by substituting the generically or specifically described materials or conditions recited herein for those set forth in the preceding Example.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:

1. A process for preparing a coated substrate, comprising the steps of:

provided a substrate;

applying onto a surface of the substrate a layer of a primer selected from the group consisting of polyamirie and polyacetate; and extrusion coating a monolithic layer of breathable polymer onto the layer of primer;

whereby said coated substrate exhibits an MVTR of greater than about 5 perms.

2. The process for preparing a coated substrate according to claim 1, wherein the substrate comprises a non-woven fabric.

3. The process for preparing a coated substrate according to claim 1, wherein the substrate comprises a non-woven fabric comprising fibers of high, medium, or low density polyethylene, polypropylene, or polybutylene, or copolymers thereof, glass, graphite, polyester, acrylic, polycarbonate, polyurethane, or blends or copolymers thereof.

4. The process for preparing a coated substrate according to claim 1, wherein the breathable polymer comprises a polyester copolymer, a polyester, polyurethane, acrylic polymer, polyether, ester-ether copolymer, or a blend or copolymer thereof.

5. The process for preparing a coated substrate according to claim 1, wherein the breathable polymer comprises a copolyester.

6. The process for preparing a coated substrate according to claim 1, wherein the primer is selected from the group consisting of polyethylene amine and polyvinyl acetate.

7. A The process for preparing a coated substrate according to claim 1, wherein the monolithic, extrusion coated breathable polymer layer has a thickness ranging from about 0.25 mils to about 1,000 mils.

8. The process for preparing a coated substrate according to claim 1, wherein the monolithic, extrusion coated breathable polymer layer has a thickness of about 1 mil.

* * * * *